US012621214B1

(12) United States Patent
Neufeld et al.

(10) Patent No.: US 12,621,214 B1
(45) Date of Patent: May 5, 2026

(54) METHOD AND SYSTEM FOR MANAGING ELECTRONIC DATA REPRESENTING ANOMALOUS EMERGENCY ALERTS

(71) Applicant: SAMDESK CANADA INC., Edmonton (CA)

(72) Inventors: James Andrew Neufeld, Edmonton (CA); Dan McEleney, Edmonton (CA); Sean Mark Solbak, Edmonton (CA)

(73) Assignee: SAMDESK CANADA INC., Edmonton (CA)

( * ) Notice: Subject to any disclaimer, the term of this patent is extended or adjusted under 35 U.S.C. 154(b) by 0 days.

(21) Appl. No.: 19/395,100

(22) Filed: Nov. 20, 2025

(51) Int. Cl.
| | |
|---|---|
| *H04L 41/142* | (2022.01) |
| *H04L 41/0681* | (2022.01) |
| *H04L 41/069* | (2022.01) |
| *H04L 41/16* | (2022.01) |

(52) U.S. Cl.
CPC ........ *H04L 41/142* (2013.01); *H04L 41/0681* (2013.01); *H04L 41/069* (2013.01); *H04L 41/16* (2013.01)

(58) Field of Classification Search
CPC . H04L 41/142; H04L 41/0681; H04L 41/069; H04L 41/16
See application file for complete search history.

(56) References Cited

U.S. PATENT DOCUMENTS

| | | | |
|---|---|---|---|
| 8,903,870 | B2 | 12/2014 | Turk et al. |
| 9,892,168 | B1 | 2/2018 | Apreleva et al. |
| 10,750,346 | B1 | 8/2020 | Di Domenico et al. |
| 11,645,603 | B1 | 5/2023 | Baker et al. |
| 12,019,697 | B2 | 6/2024 | Jayavelu et al. |
| 2019/0129821 | A1* | 5/2019 | Lee ..................... G06F 11/3452 |
| 2020/0126174 | A1 | 4/2020 | Halse et al. |
| 2020/0389551 | A1* | 12/2020 | Vaughn ............. H04M 3/42059 |
| 2021/0216928 | A1 | 7/2021 | O'Toole et al. |
| 2023/0038164 | A1 | 2/2023 | Naeini |
| 2024/0356947 | A1 | 10/2024 | Gopalakrishna et al. |

FOREIGN PATENT DOCUMENTS

| | | |
|---|---|---|
| GB | 2627289 A | 8/2024 |

* cited by examiner

*Primary Examiner* — Benjamin M Thieu
(74) *Attorney, Agent, or Firm* — PERRY + CURRIER INC.

(57) ABSTRACT

A system for managing electronic data representing emergency alerts comprises a computing device associated with an asset and a server. The server receives threshold data from the computing device and one or more data records representing reports of an event. The server computes an anomaly metric based on a comparison of the event to recent events and, if the anomaly metric does not exceed a threshold, computes a trend metric based on the frequency of similar events over time. If either metric exceeds its respective threshold, the server transmits a control signal comprising an alert to the computing device. The system may apply natural language processing, machine learning, and knowledge graphs to evaluate event characteristics and generate contextual summaries. By filtering alerts based on relevance and context, the system conserves computing resources and enables early detection of emerging threats, improving the responsiveness and efficiency of emergency alert infrastructure.

17 Claims, 8 Drawing Sheets

METHOD AND SYSTEM FOR MANAGING ELECTRONIC DATA REPRESENTING ANOMALOUS EMERGENCY ALERTS

FIELD

The present specification is directed to computer-networking communications and more specifically, computer networking involving the management of electronic data representing emergency alerts.

BACKGROUND

The widespread availability of electronic communications, such as social media posts, news articles, and government reports has enabled real-time reporting of events such as fires, shootings, and protests. Systems have been developed to aggregate and process such information and to notify users of incidents. For example, U.S. Pat. No. 10,750,346 describes a platform that collects data from mobile devices, video feeds, and social media to identify and classify emergency events, however these types of systems can generate excessive notifications, including for routine or low-priority events. This can lead to inefficient use of computing resources, including unnecessary consumption of device memory, network bandwidth, and server capacity.

SUMMARY

An aspect of the specification provides a system for managing electronic data representing emergency alerts. The system includes a computing device associated with an asset and configured to transmit threshold data. The system also includes a server configured to receive the threshold data from the computing device and to receive, from a media server, one or more data records representing reports of an event. The server is configured to generate a control signal representing the one or more data records, where the control signal includes an alert. The server is further configured to compute an anomaly metric representing a degree of similarity between the event and recent events by comparing characteristics of the event to characteristics of recent events stored in an event database. If the anomaly metric does not exceed an anomaly threshold included in the threshold data, the server retrieves similar recent events from among the recent events and similar historical events from historical events in the event database and computes a trend metric for the event by comparing the similar recent events to the similar historical events. If the anomaly metric exceeds the anomaly threshold or the trend metric exceeds a trend threshold included in the threshold data, the server transmits the control signal to the computing device.

In one example, the control signal directs the computing device to activate a navigation system.

In another example, the control signal directs the computing device to control a logistics system.

In a further example, the control signal directs the computing device to control an automated email system.

In a yet further example, the control signal directs the computing device to control a small message service system.

In one example, the system includes a plurality of devices for receiving alerts, and the server is configured to transmit the alert to the plurality of devices if the anomaly metric exceeds a global anomaly threshold or the trend metric exceeds a global trend threshold.

In another example, the server is configured to apply natural language processing and a machine learning algorithm to the one or more data records to compute the anomaly metric.

In a further example, the server is configured to apply natural language processing and knowledge graphs to the one or more data records to compute the trend metric.

In a yet further example, the server is configured to apply a machine learning algorithm to generate a written summary of the event characteristics contributing to the anomaly metric, and the alert includes the written summary.

In one example, the server is further configured to receive from the media server a plurality of data records representing a plurality of events and to generate the control signal representing the plurality of data records.

A further aspect of the specification provides a system for managing electronic data representing emergency alerts. The system includes a computing device associated with an asset and configured to transmit threshold data and a server configured to receive the threshold data and one or more media records from a media server. The server is configured to generate a control signal including an alert and compute an anomaly metric representing a degree of similarity between the event and recent events. If the anomaly metric exceeds the anomaly threshold, the server transmits the control signal to the computing device.

In one example, the control signal directs the computing device to activate a navigation system.

In a further example, the control signal directs the computing device to control a logistics system.

In a yet further example, the control signal directs the computing device to control an automated email system.

In another example, the control signal directs the computing device to control a small message service system.

In one example, the system includes a plurality of devices for receiving alerts, and the server is configured to transmit the alert to the plurality of devices if the anomaly metric exceeds a global anomaly threshold.

In another example, the server is configured to apply natural language processing and a machine learning algorithm to the one or more data records to compute the anomaly metric.

In one example, the server is configured to apply a machine learning algorithm to generate a written summary of the event characteristics contributing to the anomaly metric, and the alert includes the written summary.

A further aspect of the specification provides a system for managing electronic data representing emergency alerts. The system includes a computing device associated with an asset and configured to transmit threshold data and a server configured to receive the threshold data and one or more data records. The server is further configured to retrieve similar recent and historical events from an event database and to compute a trend metric by comparing the similar recent and historical events. If the trend metric exceeds a trend threshold included in the threshold data, the server transmits the control signal to the computing device.

In one example, the control signal directs the computing device to activate a navigation system.

In another example, the control signal directs the computing device to control a logistics system.

In a further example, the control signal directs the computing device to control an automated email system.

In a yet further example, the control signal directs the computing device to control a small message service system.

In one example, the system includes a plurality of devices for receiving alerts, and the server is configured to transmit the alert to the plurality of devices if the trend metric exceeds a global trend threshold.

In another example, the server is configured to apply natural language processing and knowledge graphs to the one or more data records to compute the trend metric.

In one example, the server is configured to apply a machine learning algorithm to generate a written summary of the event characteristics contributing to the trend metric, and the alert includes the written summary.

A further aspect of the specification provides a system for managing electronic records representing travel advisories. The system includes a computing device associated with an asset and configured to transmit itinerary data and threshold data, and a server configured to receive the itinerary and threshold data and retrieve event records representing reports of events. The server is configured to generate a control signal including travel alerts corresponding to the event records. For each travel alert, the server calculates an impact metric based on the itinerary data. If the impact metric meets an impact threshold, the control signal includes the respective travel alert. If the impact metric does not meet the impact threshold, the control signal excludes the respective travel alert.

In one example, for each travel alert, the server retrieves similar recent and historical events from the event database and computes an anomaly metric by comparing characteristics of the event record to recent events. If the anomaly metric does not exceed an anomaly threshold included in the threshold data, the server computes a trend metric and, if either the anomaly metric exceeds the anomaly threshold or the trend metric exceeds a trend threshold, the control signal includes the respective travel alert.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Embodiments are described with reference to the following figures.

DETAILED DESCRIPTION

Improved systems and methods are provided for selectively generating notifications based on a contextual evaluation of detected events. In particular, a system is disclosed that analyzes electronic records, such as social media posts and news reports, to identify events and determine whether an event is anomalous compared to recent historical events. The system computes an anomaly metric and a trend metric for each event and transmits a control signal only if at least one of the metrics exceeds a predetermined threshold. By filtering notifications in this manner, the system reduces unnecessary consumption of computing resources while providing users with alerts that are relevant and actionable.

The present disclosure pertains to a system for transmitting control signals in response to data records. The control signal is transmitted by a server to a computing device. The control signals can cause the computing device to control an alarm system, a vehicle navigation system, an automated email system, or an automated messaging system, but the control signal is not particularly limited. A useful example of a control signal, as discussed below, is an alert.

The methods, functionality, and other techniques discussed herein may be carried out by instructions, which may be directly executable (e.g., a binary file), indirectly executable (e.g., bytecode), interpreted (e.g., a script), or otherwise executable by a processor. Instructions may be stored in a non-transitory computer-readable medium, such as a memory, hard drive, or similar device.

Figure 1:
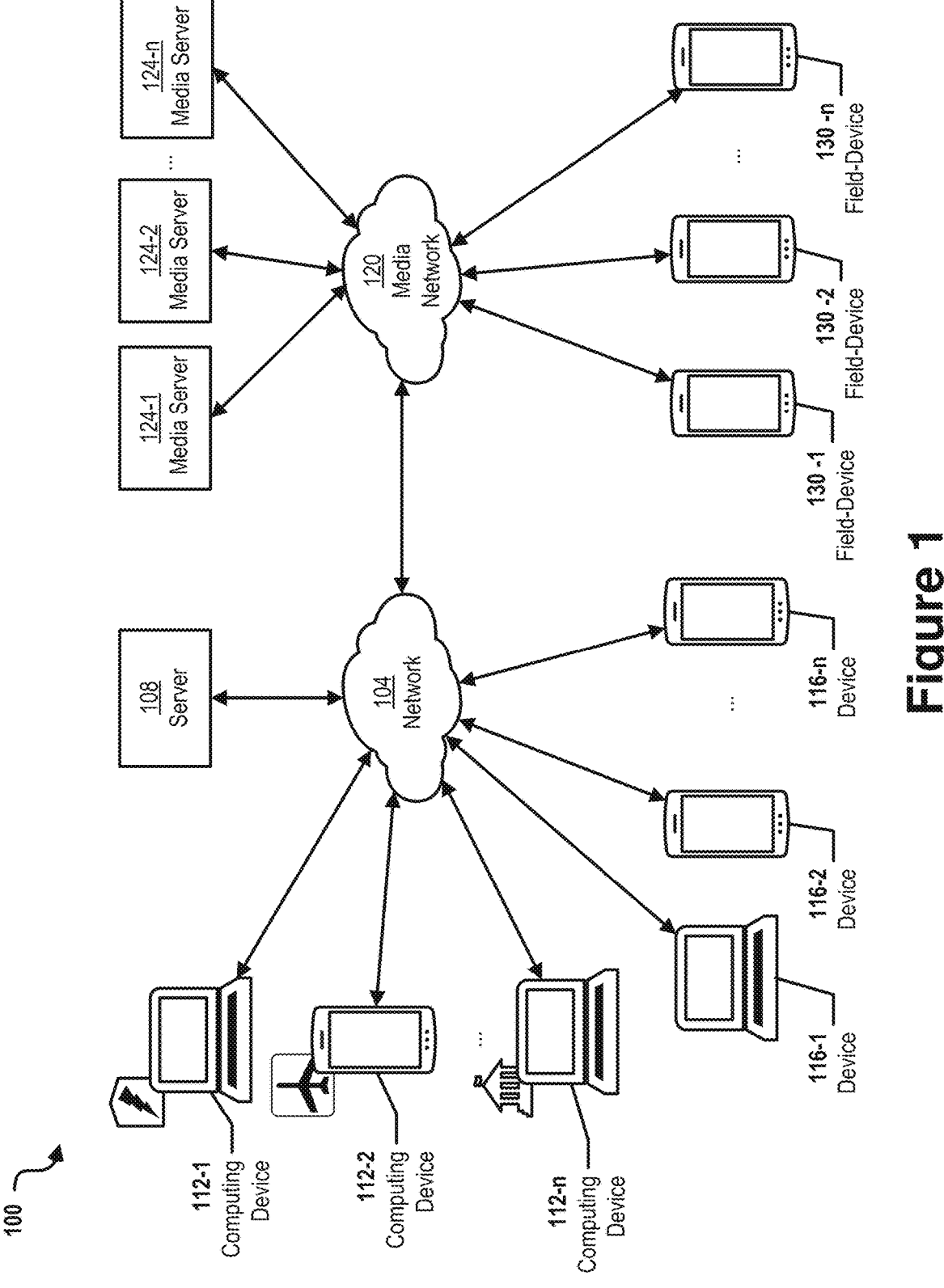
FIG. 1 is a system diagram showing a system for managing electronic data representing emergency alerts.

Referring now to FIG. 1, a system for managing alerts is indicated generally at 100. System 100 comprises a network 104 connected to a server 108 and further connected to a plurality of first computing devices 112-1, 112-2 . . . 112-n (generically referred to herein as "computing device 112" or collectively as "computing device 112") and a second plurality of target computing devices 116-1, 116-2 . . . 116-n (generically referred to herein as "devices 116" and collectively as "devices 116". This nomenclature is used elsewhere herein.). The network 104 is further connected to a media network 120. The media network 120 is connected to a plurality of media servers 124-1, 124-2 . . . 124-n. The media network 120 is further connected to a third plurality of field devices 130.

The server 108 is typically a server or mainframe with a housing containing an arrangement of one or more central processing units, volatile memory (i.e. random-access memory), persistent memory (i.e. hard disk devices) and a network interface (to allow the server 108 to communicate over the network 104), all of which are interconnected by a bus. In some embodiments, the server 108 is a virtual server. As explained in detail below, the server 108 is configured to receive alerts from the media network 120 and forward alerts to the devices 116 via the network 104.

The network 104 can be wired or wireless, or based on combinations thereof, and based on any type of known network architecture or platform, (e.g. the internet or a wide area network) or combinations thereof. Generally, network 104 provides an infrastructure to interconnect the server 108, the devices 116, and the computing devices 112.

The computing device 112 can be a wearable device, smart glasses, GPS (global positioning system) tracking device, smartphone, tablet, personal computer, vehicle navigation system, smart home system, smart appliance, smart television, building security system, general security operations center, or the like, and is configured to transmit location information to the server 108 via the network 104. In some implementations, the computing device 112 is further configured to receive alerts from the server 108.

The device 116 can be a wearable device, smart glasses, GPS tracking device, smartphone, tablet, personal computer, vehicle navigation system, smart home system, smart appliance, smart television, building security system, general security operations center, or the like, and is configured to receive alerts from the server 108. The device 116 can be configured to receive inputs from a user, the inputs representing preferences for display settings, alert types, alert thresholds, and/or assets of interest to the user, such that the user receives electronic alerts about emergency events occurring near a particular asset or assets of interest. The device 116 can be further configured to display alerts at a user interface.

Alerts can be delivered to the devices 116 and computing devices 112 by the server 108 based on electronic records received from the media servers 124. The media server 124 is typically a server or mainframe with a housing containing an arrangement of one or more central processing units, volatile memory (i.e. random-access memory), persistent memory (i.e. hard disk devices) and a network interface (to allow the media server 124 to communicate over the media network 120) all of which are interconnected by a bus. In some embodiments, the media server 124 can be a virtual server or a cloud-based server with many mirrors. The media server is configured to receive electronic records from the field devices 130.

The media network 120 can be wired or wireless, or based on combinations thereof, and based on any type of known network architecture or platform, (e.g. the internet or a wide area network) or combinations thereof. Generally, the media network 120 provides an infrastructure to interconnect the media server 124, the network 104, and the field device 130.

The field device 130 can be a smartphone, tablet, personal computer, server, or the like, and is configured to receive inputs from a user, the inputs comprising text, video, photos, and/or location information. The inputs can represent emergency events that have occurred or are occurring. For example, the inputs can be eye-witness accounts, photos and/or videos of the event or the aftermath of the event. In some implementations, the field device 130 can be located proximal to the location of the respective event. The field device 130 can be configured to generate one or more data records R based on the inputs and transmit the data records R to the media server 124 via the media network 120. In particular, non-limiting examples, the data records R comprise social media records and the media network 120 is a social media network, however other electronic records are contemplated. Other non-limiting examples of data records include news reports, weather forecasts and alerts, traffic reports, biographical data about notable individuals, travel advisories and warnings, first responder notifications, satellite and aerial imagery, local transportation authority updates, public health alerts, utility provider updates, geographic maps, and the like.

Figure 2:
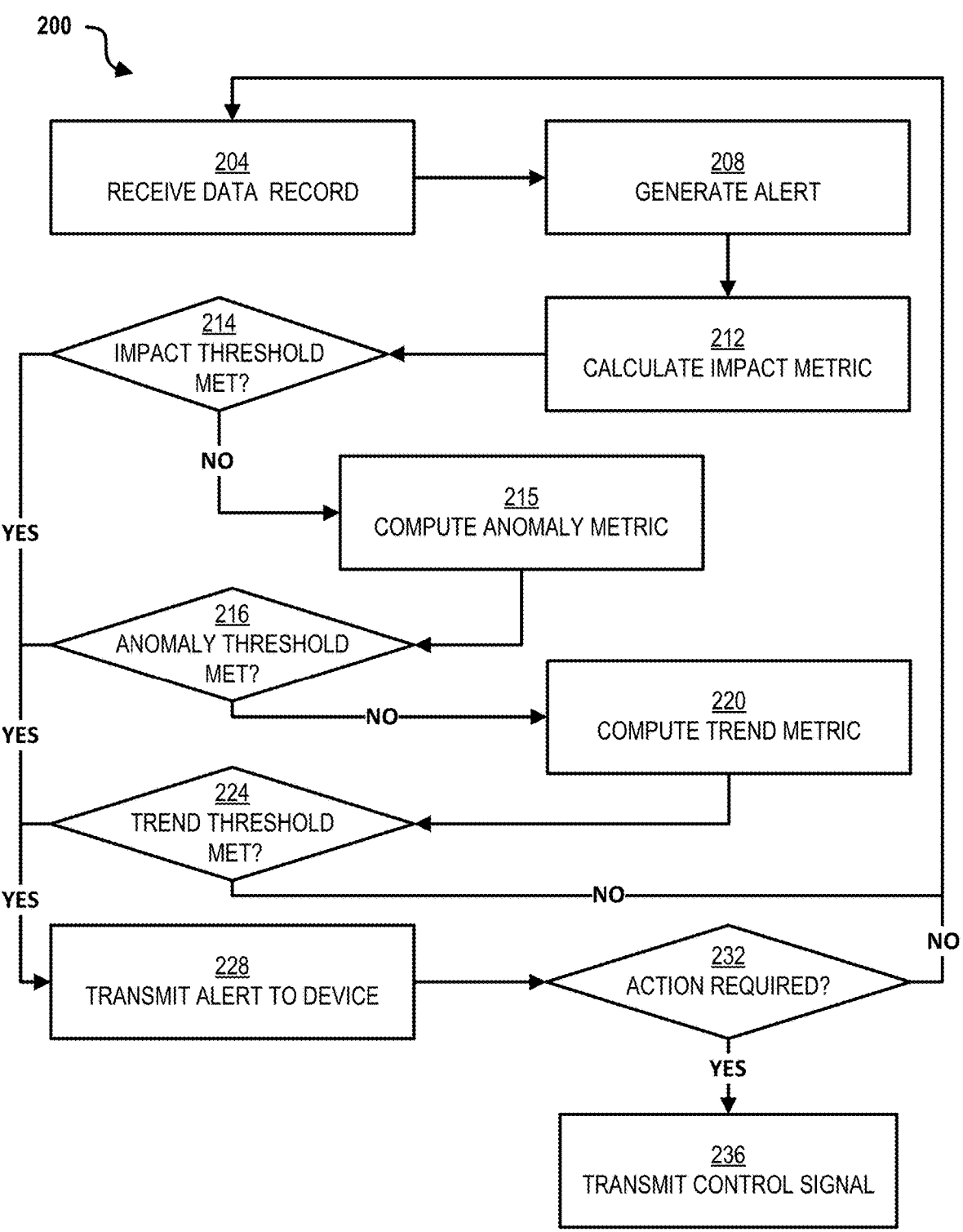
FIG. 2 is a flowchart depicting a method for managing electronic data representing emergency alerts in accordance with another embodiment.

Referring now to FIG. 2, a method for managing electronic data in accordance with another embodiment of the invention is represented as a flowchart and indicated generally at 200. In order to assist in the explanation of the method, it will be assumed that method 200 is performed using system 100. Furthermore, the following discussion of method 200 will lead to further understanding of system 100 and/or method 200 can be varied and need not work exactly as discussed herein in conjunction with each other, and that such variations are within the scope of the present invention.

Figure 3:
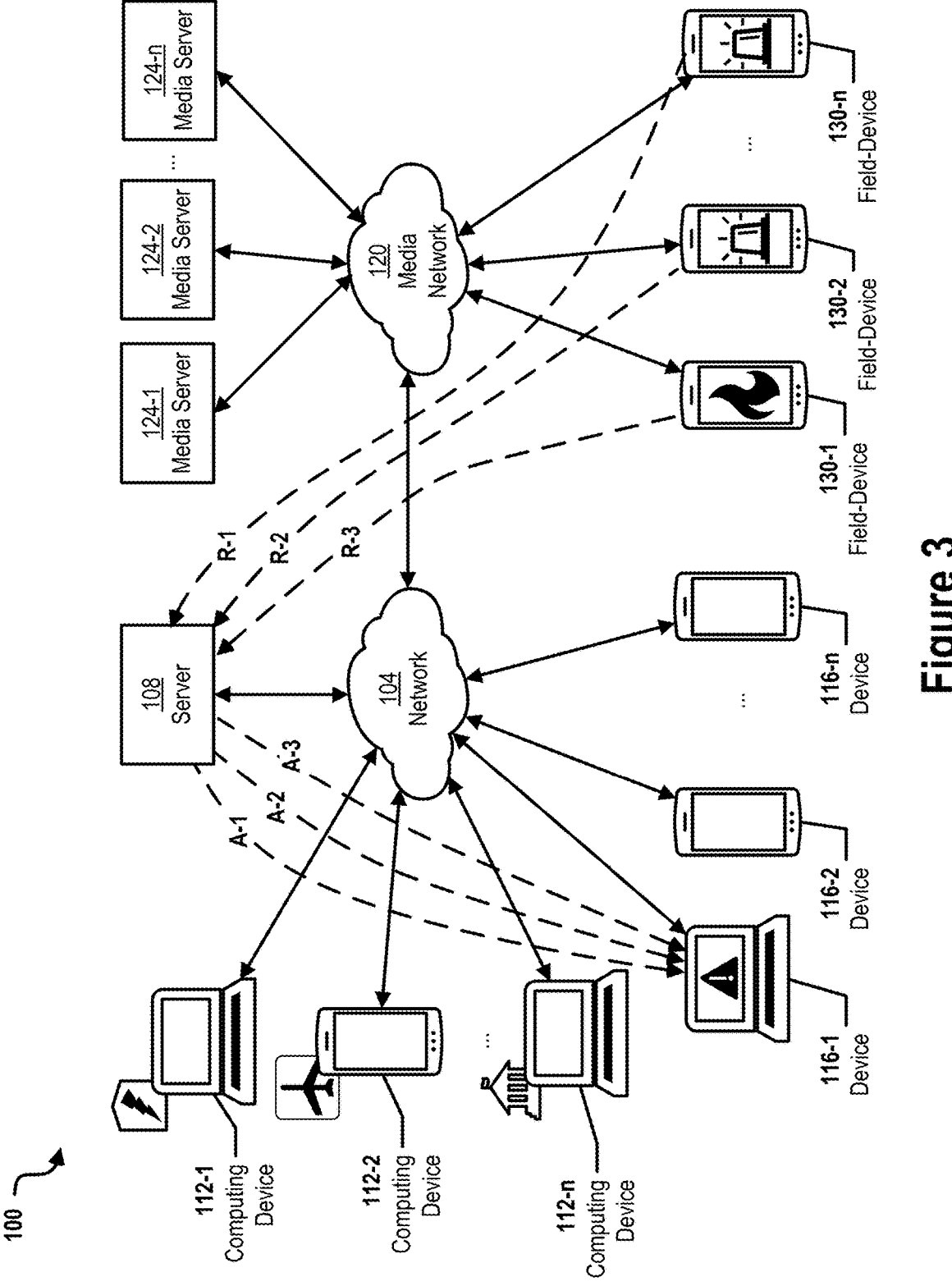
FIG. 3 is a system diagram showing the system of FIG. 1 during exemplary performance of the method of FIG. 2.

Block 204 comprises receiving a data record representing an event. In system 100, block 204 is performed by server 108 which receives at least one data record R-1, R-2, R-3. The data record R can include electronic data representing one or more of text, photos, video, user information, and location information, but the specific digital representations of the data record R are not particularly limited. Block 204 is represented in FIG. 3, where the data records R-1, R-2, R-3 are sent from the field-devices 130-1, 130-2, 130-*n* to the server 108. First, the data records R are uploaded via the media network 120 to the media server 124. Then, the data records R are transferred from the media server 124 to the server 108 via the network 104. Once received, the data records R are stored in memory at the server 108. Block 204 may be performed on a continual or periodic basis.

At block 208, server 108 generates an electronic message in the form of an alert A-0 having a payload corresponding to the payload of data record R. The alert A-0 can represent a single data record R or it may represent a plurality of data records R corresponding to the same event. When the server 108 receives a plurality of data records R, it can identify and group data records R that pertain to the same event. A number of suitable methods may be employed to identify and group data records R pertaining to the same event, for example, the server 108 can use machine learning, natural language processing, and knowledge graphs to identify similarities between the data records R. The server 108 may be further configured to identify whether a data record R pertains to a new event or an event for which the server 108 has already generated an alert A-0. As part of block 208, the server 108 can use machine learning, algorithms, natural language processing, and knowledge graphs to generate an alert A-0 representing the contents of the data records R. For instance, the alert A-0 can include the location, date and time of the event, event type, severity of the event, impact, degree of disruption, number of deaths, number of injuries, severity of injuries, photos, video, sound recordings, and number of data records R representing the event. In one example, the time and location of the event are identified through a combination of natural language processing, knowledge graphs, and an algorithm. In another example, the event type is identified through natural language processing and machine learning classification. In another example, photos associated with the event are identified using image recognition software and machine learning classification. In some embodiments, the alert A further represents data records received by the server 108 from a data management server via the network. For example, the environmental data records can include data records representing traffic conditions and data records representing weather conditions.

A person of skill in the art will now recognize that block 208 can conserve a significant amount of computing resources at the device 112 and in the network 104. Since the server 108 can transmit a single alert A-0 corresponding to a plurality of data records R, and as will become apparent with the benefit of this specification, method 200 has the benefit of reducing consumption of computing resources by the devices 116 which received a single alert A instead of multiple data records corresponding to the one event. Again, this will be discussed in greater detail below and will become apparent to a person skilled in the art having the benefit of this specification.

Block 212 comprises computing an impact metric for the alert A-0. In system 100, block 212 is performed by the server 108. In one embodiment, the server 108 calculates an impact metric using natural language processing and image classification to extract characteristics from the data record R-0, such as event location, asset location, event type, disruption level, individuals involved, geopolitical context, casualty data, weather conditions, and other contextual features. The server 108 applies a machine learning model (e.g., a Gradient Boosting Classifier) trained on a labeled dataset to assign weights to these characteristics. For instance, a high number of deaths, disruption at an international airport, the assassination of a prominent political figure, or similarities to high-profile news events may each independently result in a high impact metric. The impact metric may represent a predicted impact on the asset.

As part of block 212, the device 116-1 may transmit asset information to server 108. In these examples, the server 108 may compute the impact metric based on asset information, such as distance to asset, affected travel routes, biographical data, or political interests. For example, a hurricane affecting an airport used by an asset may result in a high impact metric. Similarly, if a protest involves a public figure of the same nationality as an asset, the alert may be assigned higher impact. This enables targeted alerting to conserve computing resources.

The impact metric may also be based on text features extracted from data records using natural language processing, with emotionally charged language (e.g., fear) contributing to a higher score. In some embodiments, the number of data records associated with an event increases the impact level, with thresholds distinguishing between "low," "medium," or "high" impact (e.g., >250 records="high").

Event-specific characteristics can further refine impact scoring. For example, earthquake magnitude or hailstone size may inform the impact of a storm alert. A numerical model may also be used, as exemplified in Equation 1:

$$impact = 2 \times (deaths) + (injuries) \tag{1}$$

The impact metric may also vary by event location. For instance, lower numerical scores may still trigger a "high" alert if the event occurs in a public area. The system may assign location-based tags (e.g., school, hospital, mosque) using machine learning, with predefined tag lists that automatically elevate impact.

Calculating the impact metric may also depend on event type and standard impact scales. For example, a small volcanic eruption might be "low," while one causing infrastructure damage or casualties may be "medium" or "high." Similarly, tornado alerts may use Enhanced Fujita Scale ratings to determine impact.

Block 214 comprises determining whether or not an impact threshold has been met. In system 100, block 214 is performed by the server 108 which receives threshold data representing a defined threshold for the impact metric from a given device 112, 116. The threshold data T represents a defined threshold for the impact metric. The threshold data T can be expressed in the same format as the impact metric, for instance, the threshold data T can express the defined threshold as a numerical value or as a "low", "medium", or "high" value. In some examples, the threshold data T can be stored in memory at the server 108 in association with an identifier corresponding to the device 116. Thus, the device 116 does not need to transmit the threshold data T each time the method 200 is performed. As will be described in greater detail herein, the threshold data T may further include other defined thresholds such as an anomaly threshold and a trend threshold.

The means by which threshold data is represented, and ultimate thresholds determined, is not particularly limited. In some implementations, the threshold data can express the defined threshold as a threshold proximity (or physical distance) metric for receiving a "high", "medium", or "low" impact alert. For instance, the threshold data could comprise a first threshold proximity metric for transmitting a "high" impact alert. If the proximity metric is greater than the first threshold proximity metric and the impact metric is "high", an alert A will not be transmitted to the device 116-1. If the proximity metric is equal to or less than the first threshold proximity metric and the impact metric is "high", the alert A will be transmitted to the device 116-1. The threshold data could further comprise a second threshold proximity metric for transmitting a "medium" impact alert. If the proximity metric is greater than the second threshold proximity metric and the impact metric is "medium", the alert will not be transmitted to the device 116-1. If the proximity metric is equal to or less than the second threshold proximity metric and the impact metric is "medium", the alert will be transmitted to the device 116-1. The threshold data could further comprise a third threshold proximity metric for transmitting a "low" impact alert. If the proximity metric is greater than the third threshold proximity metric and the impact metric is "low", the alert A will not be transmitted to the device 116. If the proximity metric is equal to or less than the third threshold proximity metric and the impact metric is "low", the alert A will be transmitted to the device 116-1.

In some examples, if the impact metric surpasses a global impact threshold, the alert is transmitted to all devices in the system 100, regardless of asset characteristics and preferences.

Note that the aforementioned transmissions occur at block 228, which will be explained in greater detail below. However also note that where the impact threshold is low, or during a widespread crisis, the server 108 and network 104 may be nonetheless overloaded with alerts. In one example, the aftermath of a hurricane causes a widespread crisis generating thousands of reports pertaining to flooding, power outages, air quality alerts, traffic disruptions, looting, missing persons, and the like. FIG. 3 shows an example where a plurality of data records R-1, R-2, R-3 corresponding to a plurality of events are received by the server 108. Since all of the events meet or exceed the impact threshold as assessed at block 214, the device 116-1 receives three alerts A-1, A-2, A-3 at block 228 corresponding to the three events. Note that the example in FIG. 3 only shows the alerts A transmitted to device 116-1, however all the devices 112, 116 in the system 100 may similarly receive the alerts A, leading to processing delays or system disruptions.

Figure 4:
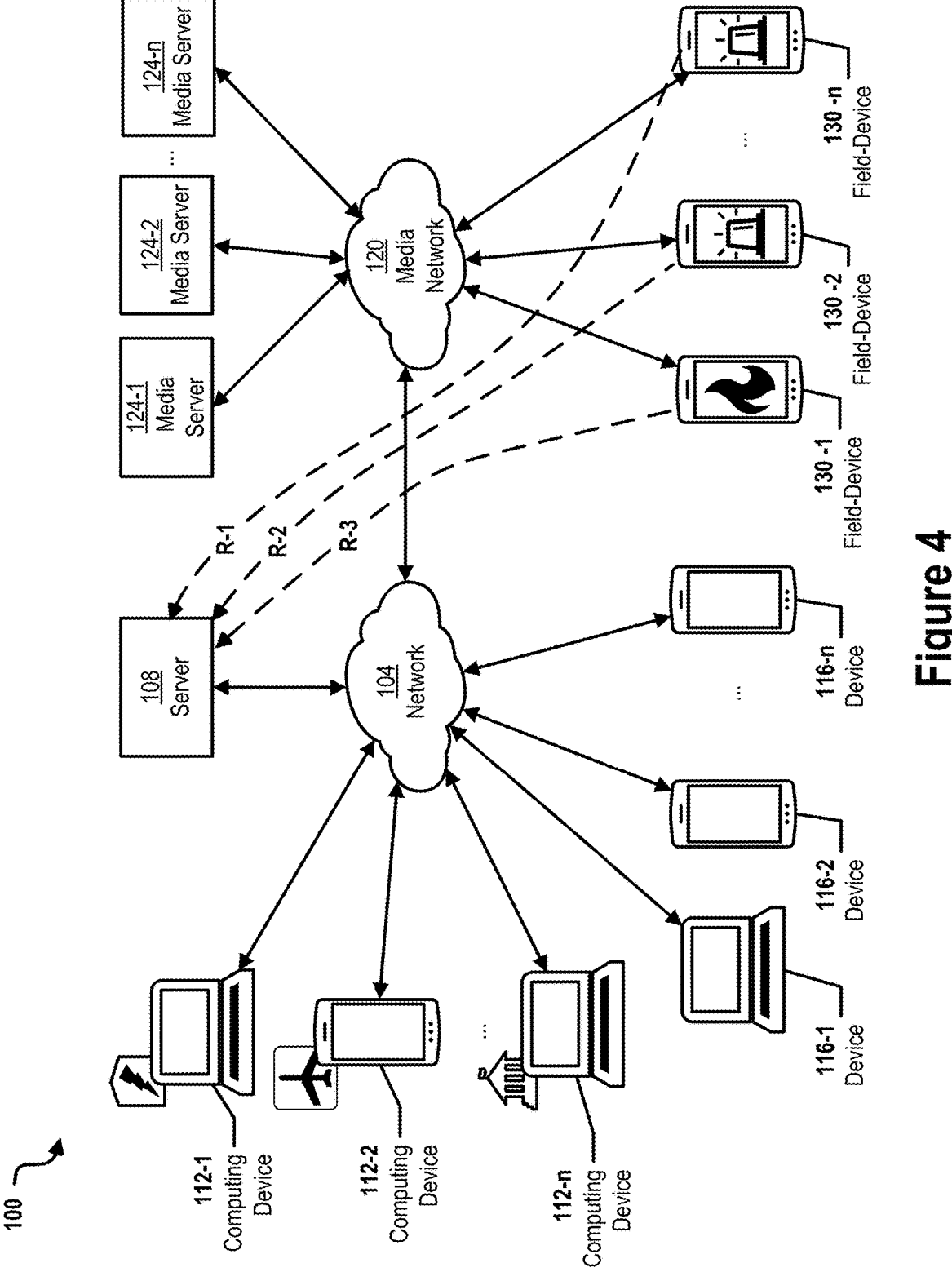
FIG. 4 is a system diagram showing the system of FIG. 1 during exemplary performance of the method of FIG. 2.
Figure 5:
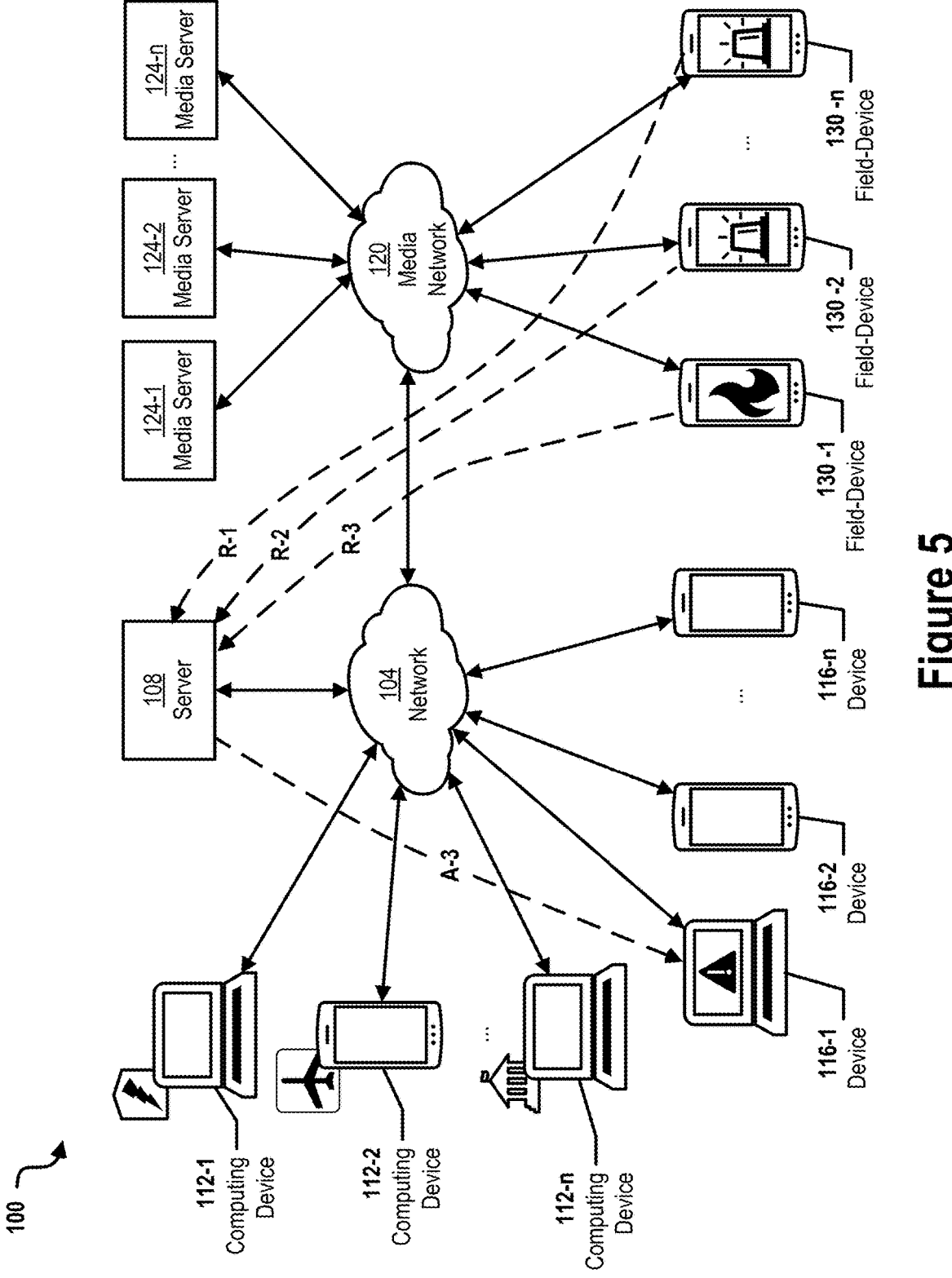
FIG. 5 is a system diagram showing the system of FIG. 1 during exemplary performance of the method of FIG. 2.

To avoid overburdening the network 104 and server 108, the impact threshold may be elevated, as represented at FIG. 4. In the example shown in FIG. 4, the server 108 receives a plurality of data records, R-1, R-2, R-3, but since none of the events meet the impact threshold, alerts are not transmitted to the device 116. As an unintended consequence, anomalous events may go undetected, such as the fire reported by the field device 130-1. To ensure that relevant events are not missed, the method 200 proceeds to block 215.

Block 215 comprises computing an anomaly metric. In system 100, block 215 is performed by the server 108 which retrieves recent events from memory for comparison. The recent events may be stored as event records in an event database in the memory, stored in association with the date on which the respective event occurred. The recent events may be further associated with one or more tags, a headline, an event summary, metrics, an event location, an event time, update data, one or more metrics (such as the proximity metric and severity metric), completion date, overrides, the like, and combinations thereof. Only event records that occurred within a predetermined period of time may be retrieved at block 215. In specific, non-limiting embodiments, the predetermined period of time is between 1 hour and 1 day. In other, non-limiting embodiments, the predetermined period of time is between 1 and 4 weeks. In further, non-limiting embodiments, the predetermined period is between 1 and 12 months. In further, non-limiting embodiments, the predetermined period is between 1 and 5 years.

The database can be populated with event records based on the data records R received by the server 108. In some examples, the database is populated with event records based on electronic data received from government databases, police databases, local fire departments, environmental agencies and weather services, utility providers, telecommunications providers, transit authorities, public health organizations, news agencies and media aggregators, the like, and combinations thereof.

As part of block 215, the server 108 compares the event to the recent events retrieved from memory by comparing characteristics of the event to characteristics of the recent events and calculating an anomaly metric. The anomaly metric represents the degree of similarity between the event and the recent events. The server 108 may apply embeddings to assess the similarity between the event and recent events. As part of this comparison, the server 108 may assign relative weights to different characteristics based on event type.

Block 216 comprises determining whether the anomaly metric meets an anomaly threshold or not. The anomaly threshold may be included in the threshold data T received from the device 116-1 or the anomaly threshold may be programmed at the server 108. The anomaly threshold represents a defined threshold for the anomaly metric. The anomaly metric and the anomaly threshold may be expressed numerically. In a non-limiting example, the anomaly metric is represented on a scale from 0 to 1, where 0 indicates an extremely frequent event, and 1 represents an extremely rare event. The anomaly metric and the anomaly threshold may be expressed categorically, for example "low", "medium", or "high".

In some examples, the threshold data may include different anomaly thresholds for respective types of events. For example, the anomaly threshold for a fire may be lower than the anomaly threshold for a weather event. Thus, if a fire is slightly anomalous in nature, the device 116 may be alerted whereas, anomalous weather events may not be reported to the device 116.

In some examples, the server 108 may further compare the anomaly metric to a global anomaly threshold. In these examples, the global anomaly threshold is stored at the server 108 and represents an event that is sufficiently anomalous to warrant alerting all devices 112, 116. In a specific, non-limiting example, when snowfalls in Singapore, all devices in the system 100 receive a corresponding alert A.

If the anomaly metric meets or exceeds the anomaly threshold, the alert is sent to the device 116, as described in greater detail with respect to block 228. If the anomaly metric does not meet the anomaly threshold, the method 200 proceeds to block 220.

Block 220 comprises computing a trend metric representing the change in frequency of similar events. In system 100, block 220 is performed by the server 108, which calculates the trend metric based on a comparison between the recent events and historical events to determine whether events similar to the event have been increasing or decreasing in frequency.

As part of block 220, the server 108 identifies similar recent events from among the recent events retrieved previously at block 215. Similar recent events are identified based on the similarity of characteristics as compared to the event, such as event type, location, severity, and the like. In some examples, the server 108 applies embeddings to identify and group recent events that are similar, however the method is not particularly limited to embeddings. Generally, any similarity model known in the art may be applied to identify similar recent events. The server 108 may only identify event records as similar recent events if the event occurred within a predetermined period of time, for example, between 1-4 weeks before the event, between 1 and 12 months before the event, or between 1 and 5 years before the event.

As a further part of block 220, the server 108 retrieves similar historical events from among historical events stored in memory. The historical events may be stored as event records in the event database stored in memory at the server 108. The server 108 identifies the similar historical events based on the similarity of characteristics as compared to the event, such as event type, location, severity, and the like. Generally, the server 108 identifies the similar historical events using the same criteria as the similar recent events. The server 108 may only identify event records as similar historical events if the event occurred within a predetermined period of time. The predetermined period of time may be selected to avoid overlap with the period of time defining the recent events.

In a specific example where the alert A corresponds to a forest fire in California, the server 108 retrieves event records corresponding to fires within California that occurred within the last 12 months. The server 108 identifies the event records that are dated between 1 and 4 weeks before the event as similar recent events and identifies the event records that are dated more than 4 weeks before the event as similar historical events. The server 108 then calculates the frequency of the recent forest fires and further calculates the frequency of historical forest fires and determines that the number of forest fires has doubled. The trend metric is computed at 200%.

Block 224 comprises determining whether the trend metric meets a trend threshold or not. The trend threshold may be included in the threshold data T received from the device 116-1 or the trend threshold may be programmed at the server 108. The trend threshold represents a defined threshold for the trend metric. The trend threshold may be expressed as a numerical value or as a "low", "medium", or "high" value.

If the trend metric meets or exceeds the trend threshold, the alert is sent to the device 116, as described in greater detail with respect to block 228. If the trend metric does not meet the trend threshold, no alert is transmitted and the method returns to block 204.

In the specific example described above where the trend metric for California forest fires is 200%, the server 108 compares the trend metric to the trend threshold, which in this example is 175%. Since the trend metric exceeds the trend threshold, the server 108 determines that the trend is significant enough to alert the device 116.

In some examples, the server 108 may further compare the trend metric to a global trend threshold. In these examples, the global trend threshold is stored at the server 108 and represents a trend that is sufficiently drastic to warrant alerting all devices 112, 116. In a specific, non-limiting example, when the number of forest fires in California triples within a week (i.e., the trend metric is 300%), all devices in the system 100 receive the corresponding alert A.

Block 228 comprises transmitting an alert to the device 112, 116. In system 100, block 228 is performed by the server 108 which transmits the alert A via the network 104. The alert A can be formatted to display some or all of the following on the device 116, although the alert A is not particularly limited: the impact metric, the anomaly metric, the trend metric, a headline, the event type, a description of the event, images, video, sound recordings, hyperlinks to web pages, and the data record R corresponding to the event. In some instances, the anomaly metric is indicated as "high", "medium", or "low", or the anomaly metric may be indicated by colors corresponding to "high", "medium", or "low". The format of the alert A may depend in part on the device 116 receiving the alert A. For instance, if the device 116 has a small display, the alert A-0 may comprise the anomaly metric or the trend metric and a single headline indicating a portion of the total data associated with the event. If the device 116 has a large display, the alert A may further comprise media and additional data associated with the event. The format of the alert A may further depend on inputs received by the device 116, the inputs representing preferences.

Block 232 comprises determining whether an action is required by the device. In system 100, the server 108 determines whether or not a response is required based on the alert A. The determination may be further based on the asset information transmitted by the device 116, which may include data about the asset or systems controlled by the given device 112, 116. Such asset information may be stored in memory at the server 108 and may be updated periodically or continually. If the server 108 determines that a response is required, the method proceeds to block 236.

Figure 6:
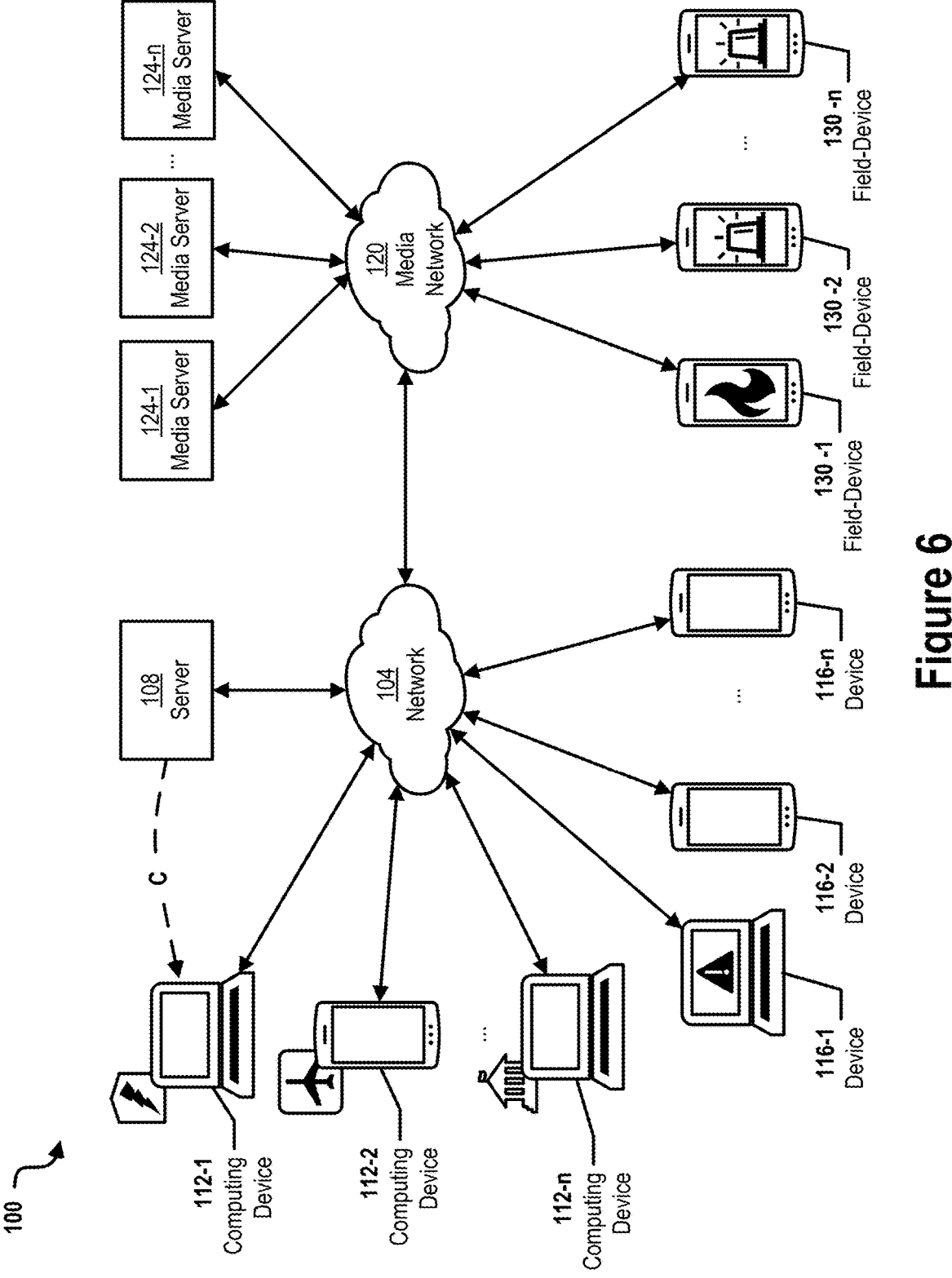
FIG. 6 is a system diagram showing the system of FIG. 1 during exemplary performance of the method of FIG. 2.

Block 236 comprises transmitting a control signal. In system 100, block 236 is performed by the server 108 which transmits a control signal to the computing device 112-1 via the network 104, as illustrated at FIG. 6.

The control signal C will now be described by way of example. In one example, the server 108 may transmit a control signal C to the device 112, 116 that causes the device 112, 116 to activate an automated email service. In response, the device 112, 116 sends a signal to an email server causing the server to transmit automated emails, the emails including the alert A. In another example, the device 112, 116 may control an automated short message service (SMS) server. The server 108 may transmit a control signal C controlling the device 112, 116 to send a signal to an SMS server, the signal controlling the SMS server to transmit SMS messages that may include the alert A. If the alert A indicates that several small but atypical protests are occurring in a city, the control signal C may control the device 112 to send SMS messages to law enforcement personnel, requesting them to report for duty. In another example, the asset associated with the device 112 is a power distribution network, and the device 112 controls an energy management system associated with the power distribution network. If the alert A indicates an unusual number of air-conditioner failures, the control signal C controls the energy management system to redistribute electrical power in the network to avoid blackouts during the heatwave. In another example, the asset associated with the device 112 is a ride-sharing vehicle and the device 112 controls a navigation system associated with the vehicle. If the alert A indicates an anomalous rise in pedestrians along or near a programmed route, the control signal C causes the device 112 to redirect the vehicle towards crowds in anticipation that ride requests will increase. In a further example, the device is a personal computing device or smartphone that is programmed with a travel itinerary and the control signal C may control the device 116 to regenerate a travel itinerary. For instance, if the alert A indicates that reports of gunfire have been increasing near a hotel in the travel itinerary, the control signal C controls the device 116 to check availabilities at other hotels in the same city by receiving reservation data from a server associated with the other hotels. In yet further examples, the device 112, 116 may be a computing device in a logistics network and the control signal C may cause the device 112, 116 to adjust pricing, inventory, delivery routes, and other factors based on the alert A. If the alert A indicates that construction has been trending upwards in a neighborhood, the control signal C may cause the device 112, 116 to increase inventory in the neighborhood, in anticipation that the neighborhood's population will soon rise. Since the determination at block 232 sometimes does not result in a control signal C being transmitted to the device 112, 116, the system 100 conserves bandwidth over the network 104 and computing resources at the devices 112, 116.

Figure 7:
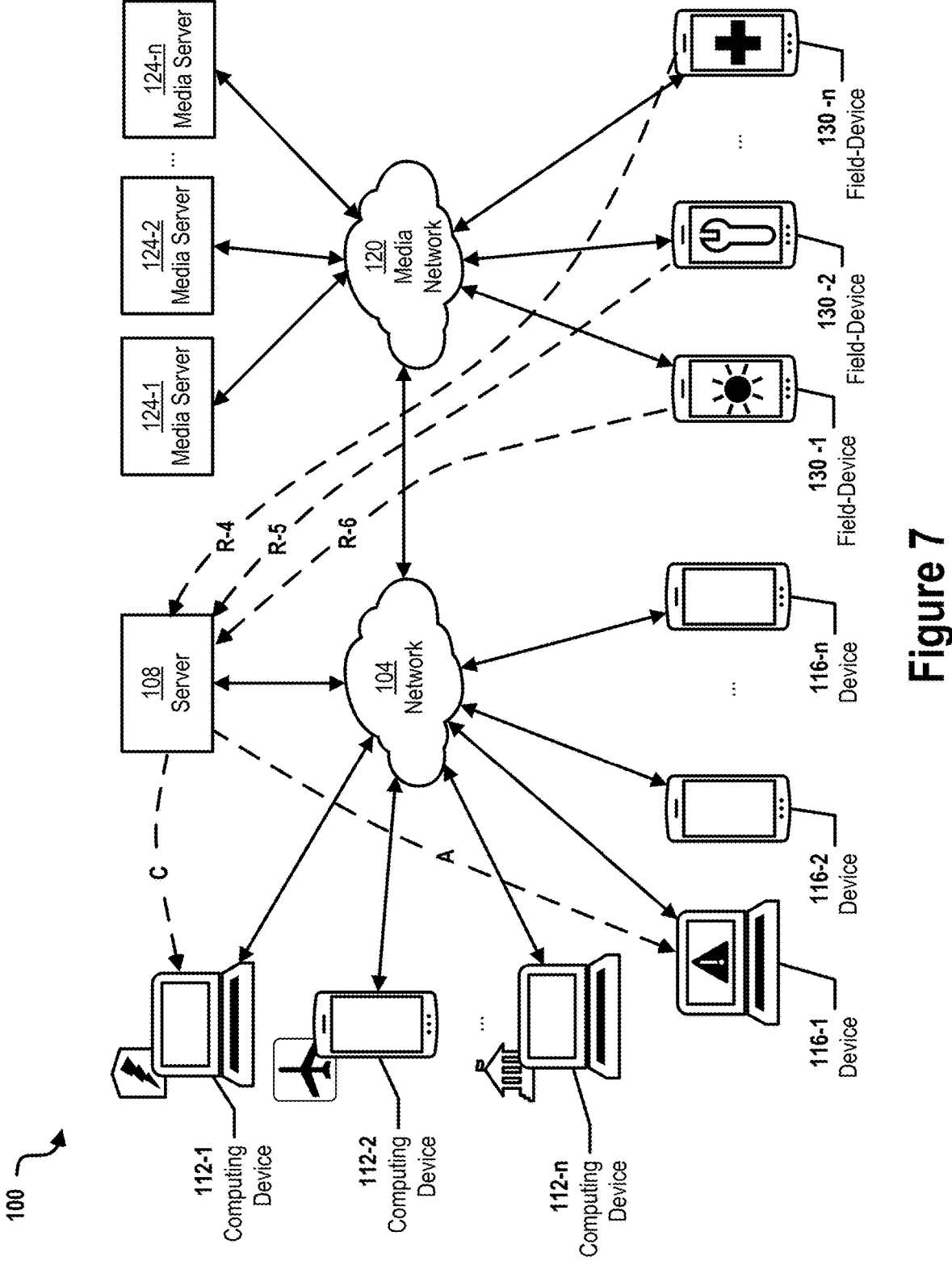
FIG. 7 is a system diagram showing the system of FIG. 1 during exemplary performance of the method of FIG. 2.

In some examples, the alert generated at block 208 represents a plurality of events. As part of block 208, the server 108 correlates a plurality of events and generates a prediction based on the correlation. An example is shown in FIG. 7 which illustrates the field devices 130-1, 130-2, 130-n transmitting a plurality of data records R-4, R-5, R-6 representing different events. In this non-limiting example, record R-6 represents warm weather, record R-5 represents an air-conditioning repair request, and record R-4 represents a heat-related health event. The alert A generated at block 208 combines the three events based on a prediction that there is a heatwave or an impending heatwave. While none of these events in isolation are sufficiently anomalous to warrant an alert, the combined alert is sufficiently anomalous to be transmitted to the device 116. The control signal C comprising the combined alert is transmitted to the computing device 112 which is associated with a power distribution network, and the device 112 controls an energy management system associated with the power distribution network to redistribute electrical power in the network to avoid blackouts during the heatwave.

Travel Alerts

Figure 8:
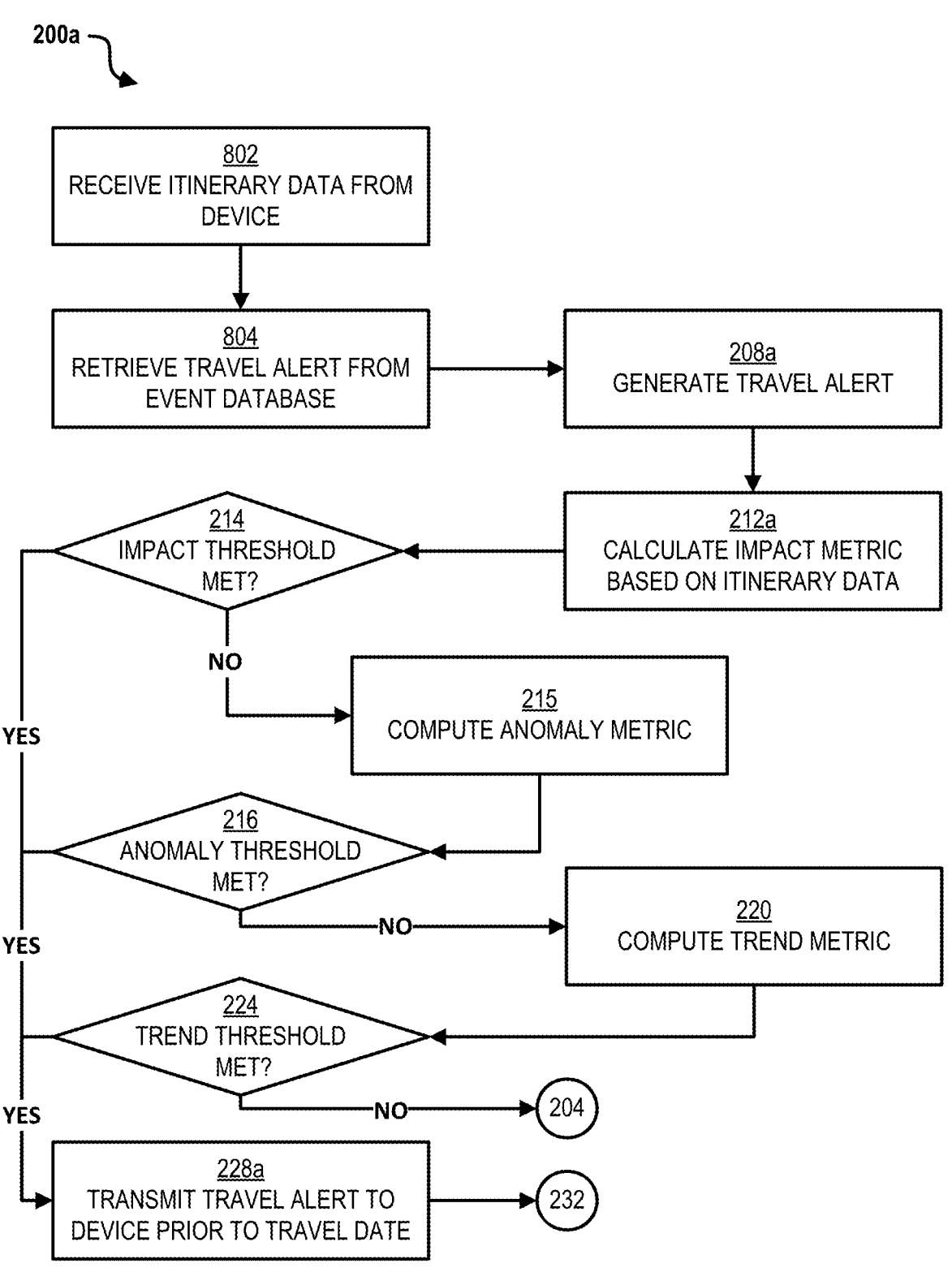
FIG. 8 is a flowchart depicting a method for managing electronic data represent travel alerts.

In specific examples, the alert A comprises a travel alert. FIG. 8 shows an example method 200a of managing electronic records representing travel alerts. In order to assist in the explanation of the method, it will be assumed that method 200a is performed using system 100. Method 200a is a variation of method 200, and any description of method 200 similarly applies to method 200a, unless otherwise specified herein.

At block 802, the server 108 receives itinerary data from the device 116-1, the itinerary data comprising at least one travel date and at least one travel location corresponding to future travel by the asset associated with the device 116-1. The travel data and travel location may include transportation information (such as a departure time, departure location, arrival time, arrival location), accommodation information (such as dates of stay, type of accommodation, and accommodation location), the like, and combinations thereof. The itinerary data may further include asset attributes which may affect the impact of events as experienced by the asset. Asset attributes may include health conditions, nationality, age, religion, ethnicity, language proficiency, mobility, sexual orientation, gender, dietary needs, clothing preferences, habitual behaviors (such as smoking, vaping, or chewing gum), travel insurance coverage, familiarity with the travel destination, travel experience, family or other contacts at the destination, tour guide information, the like, and combinations thereof.

As a further part of block 802, the server 108 may retrieve destination data from memory, the destination data including attributes of the travel location indicated in the itinerary data. Destination data may include environmental conditions, language(s) spoken, population density, local laws and customs, accessibility of medical services, infrastructure reliability, the like, and combinations thereof.

At block 804, the server 108 retrieves recent events from memory. As described above with respect to block 215, the recent events may be stored as event records in an event database, and only event records that occurred within a predetermined period of time may be retrieved at block 804. In specific, non-limiting embodiments, the predetermined period of time is between 1 hour and 1 day. In other, non-limiting embodiments, the predetermined period of time is between 1 and 4 weeks. In further, non-limiting embodiments, the predetermined period is between 1 and 12 months. In further, non-limiting embodiments, the predetermined period is between 1 and 5 years. Generally, the server 108 only retrieves recent events related to the one or more travel locations, or within a predefined proximity of the travel location.

At block 208a, the server 108 generates an electronic message in the form of a travel alert, the travel alert corresponding to at least one of the recent events retrieved at block 804. In some examples, the server 108 generates a travel alert for each of the event records retrieved from the event database, and blocks 212a to 224 are performed for each travel alert.

At block 212a, the server 108 calculates the impact metric for the travel alert based on the travel location instead of the asset location. Therefore, the device 116-1 receives travel alerts for events occurring at the travel destination. As a further part of block 212a, the server 108 may compute the impact metric based on asset attributes. In a specific non-limiting example, the travel alert represents religious protests near the travel destination; if the asset is gender diverse, the server 108 will calculate a higher impact metric than if the asset were cis-gender. In another non-limiting example, the asset is a Pakistani national travelling to Karachi and will be staying with family; the server 108 assigns a low impact metric to a travel alert reporting a kidnapping. In a further non-limiting example, the travel alert represents an increase in air pollution at the travel destination; if the asset has asthma, the server 108 will calculate a higher impact metric than if the asset did not have asthma. In a yet further non-limiting example, the travel alert represents a disruption to local supply chains due to recent earthquakes; if the asset relies on insulin, the impact metric will be elevated to reflect the risk that access to insulin may be unreliable. In another non-limiting example, the travel alert represents a recent outbreak of an air-borne pathogen; if the asset is immunocompromised, the impact metric will be higher than if the asset had a healthy immune system. Generally, the calculation at block 212a conserves network resources by only transmitting travel alerts that are most relevant to the asset associated with the device 116, based on the asset attributes and itinerary data.

At block 228a, the travel alert is transmitted to the device 116-1 prior to the travel date. The travel alert may be transmitted at a predetermined date prior to the travel date. In specific examples, the travel alert is transmitted 1 month, 2 weeks, 1 week, or 1 day prior to the travel date. To improve the relevance of the travel alert, the travel alert may only represent data records R that were received by the server 108 within a predetermined period prior to the travel date. In examples where the server 108 generates a plurality of travel alerts at block 208a, the server 108 may generate a combined travel alert at block 228a for transmission to the device 116, the combined travel alert including a summary of the travel alerts that met the impact threshold, anomaly threshold, and/or the trend threshold. As will now be understood, block 228a can conserve considerable resources in the system 100 by combining multiple events into one combined travel alert that is transmitted to the device 116-1 in advance of the travel date.

After sending the travel alert or combined travel alert, the method proceeds to block 232, and the server 108 determines whether action is required. In a specific example, the server 108 may determine whether or not to revise the travel itinerary in response to the travel alert. If action is required, a control signal C may be transmitted to one of the devices 112, 116 in order to effect the required action.

Method 200a may be iterative. After sending the travel alert at block 228a, the server 108 may be configured to generate and transmit additional travel alerts in response to receiving further data records. For example, the device 116-1 may receive an updated travel alert closer to the travel date if new events occur that meet the impact threshold, anomaly threshold, and/or the trend threshold. Updated travel alerts may also be transmitted from the server 108 to the device 116-1 during the travel period. When generating updated travel alerts during the travel period, the impact metric may be based on the current asset location rather than the travel location from the itinerary data.

In view of the above, it will now be apparent that variants, combinations, and subsets of the foregoing embodiments are contemplated. For example, while the system and method has been described with respect to emergency alerts, it may similarly be used to manage electronic data representing non-emergency events.

It will be apparent to one of skill in the art that the system and method described herein offer substantial technical improvements over prior alerting systems. Traditional systems often focus solely on detecting and classifying current events in isolation, without evaluating the broader historical or contextual significance of those events. As a result, they may trigger alerts indiscriminately, including for routine or expected occurrences, leading to alert fatigue and inefficient use of computing resources. In contrast, the present system computes an anomaly metric and a trend metric based on characteristics of data records and event data stored in an event database, enabling a context-aware analysis of whether an event is meaningfully different from prior events or indicative of a developing pattern.

The server transmits a control signal to the computing device only if the anomaly metric exceeds an anomaly threshold or the trend metric exceeds a trend threshold, both of which may be specified by the computing device. This selective alerting approach improves computing efficiency by reducing unnecessary notifications and conserving resources such as device memory, network bandwidth, and server load. It also allows the system to scale effectively while monitoring high-volume global data streams in real time.

The system further provides multi-dimensional analysis by recognizing patterns across environmental, social, and geopolitical domains, enabling the detection not only of immediate crises but of broader disruptions with cascading effects (e.g., drought-induced migration or escalating civil unrest). The control signal may direct automated systems such as navigation tools, logistics platforms, or communication networks to take targeted action in response to a relevant alert.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A system for managing electronic data representing emergency alerts, the system comprising a computing device associated with an asset and configured to transmit threshold data; and a server configured to:

receive the threshold data from the computing device;

receive from a media server, one or more data records representing reports of an event;

generate a control signal representing the one or more data records, the control signal comprising an alert;

compute an anomaly metric representing a degree of similarity between the event and recent events by comparing characteristics of the event to characteristics of recent events stored in an event database;

if the anomaly metric does not exceed an anomaly threshold included in the threshold data:

retrieve similar recent events from among the recent events and similar historical events from historical events in the event database; and compute a trend metric for the event by comparing the similar recent events to the similar historical events; and if the anomaly metric exceeds the anomaly threshold or the trend metric exceeds a trend threshold included in the threshold data, transmit the control signal to the computing device.

2. The system of claim 1 wherein the control signal directs the computing device to activate a navigation system.

3. The system of claim 1 wherein the control signal directs the computing device to control a logistics system.

4. The system of claim 1 wherein the control signal directs the computing device to control an automated email system.

5. The system of claim 1 wherein the control signal directs the computing device to control a small message service system.

6. The system of claim 1 further comprising a plurality of devices for receiving alerts, wherein the server is configured to transmit the alert to the plurality of devices if the anomaly metric exceeds a global anomaly threshold or the trend metric exceeds a global trend threshold.

7. The system of claim 1 wherein the server is further configured to apply natural language processing and a machine learning algorithm to the plurality of data records to compute the anomaly metric.

8. The system of claim 1 wherein the server is further configured to apply natural language processing and knowledge graphs to the one or more data records to compute the trend metric.

9. The system of claim 1 wherein the server is further configured to apply a machine learning algorithm to generate a written summary of the event characteristics contributing to the anomaly metric, and wherein the alert includes the written summary.

10. The system of claim 1 wherein the server is further configured to:

receive from the media server, a plurality of data records representing a plurality of events; and generate the control signal representing the plurality of data records.

11. A system for managing electronic records representing travel alerts, the system comprising:

a computing device associated with an asset and configured to transmit itinerary data and threshold data; and a server configured to:

receive the itinerary data and the threshold data from the computing device;

retrieve event records from an event database, the event records representing reports of events;

generate a control signal representing the event records, the control signal comprising travel alerts corresponding to the event records; and for each of the travel alerts, calculate an impact metric based on the itinerary data, the impact metric representing a predicted impact of the event on the asset;

if the impact metric meets an impact threshold from the threshold data, transmit the control signal including the respective travel alert to the computing device; and if the impact metric does not meet the impact threshold, transmit the control signal excluding the respective travel alert to the computing device.

12. The system of claim 11 wherein the control signal directs the computing device to control a logistics system to regenerate the itinerary data.

13. The system of claim 11 wherein, for each of the travel alerts, the server is further configured to:

retrieve similar recent events from among recent events stored in the event database and retrieve similar historical events from historical events in the event database;

compute an anomaly metric representing a degree of similarity between the event record and recent events by comparing characteristics of the event record to characteristics of recent events stored in the event database;

if the anomaly metric does not exceed an anomaly threshold included in the threshold data:

retrieve similar recent events from among the recent events and similar historical events from historical events in the event database; and compute a trend metric for the event record by comparing the similar recent events to the similar historical events; and if the anomaly metric exceeds the anomaly threshold or the trend metric exceeds a trend threshold included in the threshold data, transmit the control signal including the respective travel alert.

14. The system of claim 13 wherein the itinerary data includes asset attributes representing one or more characteristics of the asset.

15. The system of claim 14, wherein the itinerary data includes a travel location, and wherein the server is further configured to retrieve destination data from the memory, the destination data representing characteristics of the travel location.

16. The system of claim 15, wherein the itinerary data includes a travel date, the server further configured to transmit the control signal to the computing device at a predetermined date prior to the travel date.

17. The system of claim 16, wherein the server is further configured to generate an updated control signal in response to receiving further event records.

\* \* \* \* \*